United States Patent
Marey

(10) Patent No.: US 12,242,556 B2
(45) Date of Patent: Mar. 4, 2025

(54) SYSTEMS AND METHODS TO AUTOMATICALLY CATEGORIZE SOCIAL MEDIA POSTS AND RECOMMEND SOCIAL MEDIA POSTS

(71) Applicant: Adeia Guides Inc., San Jose, CA (US)

(72) Inventor: Yusuf AbdElhakam AbdElkader Marey, Tulsa, OK (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 16/927,372

(22) Filed: Jul. 13, 2020

(65) Prior Publication Data
US 2022/0012296 A1    Jan. 13, 2022

(51) Int. Cl.
G06F 16/9536    (2019.01)
G06F 16/9032    (2019.01)
G06F 16/9538    (2019.01)
G06F 40/30      (2020.01)
G06F 40/58      (2020.01)
G06N 20/00      (2019.01)

(52) U.S. Cl.
CPC .... *G06F 16/9536* (2019.01); *G06F 16/90332* (2019.01); *G06F 16/9538* (2019.01); *G06F 40/30* (2020.01); *G06F 40/58* (2020.01); *G06N 20/00* (2019.01)

(58) Field of Classification Search
CPC .......... G06F 16/9536; G06F 16/90332; G06F 16/9538; G06F 40/30; G06F 40/58; G06N 20/00; G06N 3/0445; G06N 5/02; G06N 3/0454; G06N 3/084; G06N 3/088; G06N 7/005
See application file for complete search history.

(56) References Cited

U.S. PATENT DOCUMENTS

| | | | |
|---|---|---|---|
| 7,761,399 B2 * | 7/2010 | Evans | G06F 16/958 706/55 |
| 8,521,818 B2 | 8/2013 | McGann et al. | |
| 8,655,938 B1 * | 2/2014 | Smith | G06F 16/24578 709/200 |
| 9,986,391 B2 | 5/2018 | Cho | |
| 10,162,884 B2 * | 12/2018 | Thirugnanasundaram | G06Q 10/10 |

(Continued)

OTHER PUBLICATIONS

Rafael Schirru "Topic-based recommendations in enterprise social media sharing platforms" RecSys '10: Proceedings of the fourth ACM conference on Recommender systemsSep. 2010, pp. 369-372https://doi.org/10.1145/1864708.1864793 (Year: 2010).*

*Primary Examiner* — Mark D Featherstone
*Assistant Examiner* — Kweku William Halm
(74) *Attorney, Agent, or Firm* — Haley Guiliano LLP

(57) ABSTRACT

Systems and methods are described to generate for presentation recommended social media posts for a user. The recommended social media posts may be generated based on one or more identified content categories of a first social media post by a first user and one or more parsed social media posts by one or more other users, where the one or more social media posts are associated with the first social media post. In response to determining that selection of the recommended social media post has been received, a second social media post associated with the first social media post may be generated, where the second social media post corresponds to the recommended social media.

20 Claims, 8 Drawing Sheets

(56) References Cited

U.S. PATENT DOCUMENTS

| | | | |
|---|---|---|---|
| 11,688,159 B2* | 6/2023 | Peng | G06N 3/08 |
| | | | 707/730 |
| 11,836,204 B1* | 12/2023 | Carter | G06F 16/9535 |
| 2011/0113320 A1* | 5/2011 | Neff | G06Q 10/10 |
| | | | 707/827 |
| 2012/0265819 A1* | 10/2012 | McGann | G06Q 10/00 |
| | | | 709/204 |
| 2013/0191372 A1* | 7/2013 | Lee | H04L 51/52 |
| | | | 707/769 |
| 2014/0040371 A1* | 2/2014 | Gurevich | G06F 16/951 |
| | | | 709/204 |
| 2014/0164398 A1* | 6/2014 | Smith | H04L 51/32 |
| | | | 707/748 |
| 2015/0012822 A1* | 1/2015 | Dijulio | G06F 3/04842 |
| | | | 715/716 |
| 2015/0088684 A1* | 3/2015 | Nygaard | G06Q 30/0282 |
| | | | 705/26.7 |
| 2015/0278916 A1* | 10/2015 | Stoll | G06Q 30/0609 |
| | | | 705/26.7 |
| 2016/0037311 A1* | 2/2016 | Cho | H04M 1/72433 |
| | | | 455/466 |
| 2016/0112761 A1* | 4/2016 | Venkataraman | H04N 21/252 |
| | | | 725/14 |
| 2016/0125451 A1* | 5/2016 | Garg | G06Q 30/0243 |
| | | | 705/14.42 |
| 2017/0308589 A1* | 10/2017 | Liu | G06Q 50/01 |
| 2018/0077543 A1* | 3/2018 | Cho | G06Q 30/02 |
| 2018/0101614 A1* | 4/2018 | Kuipers | G06Q 50/01 |
| 2019/0394153 A1* | 12/2019 | McGregor, Jr. | G06V 30/274 |
| 2020/0036659 A1* | 1/2020 | Wu | G06F 40/30 |
| 2020/0089763 A1* | 3/2020 | Malik | G06N 20/00 |
| 2021/0165842 A1* | 6/2021 | Segal | G06Q 50/01 |

\* cited by examiner

600

SYSTEMS AND METHODS TO AUTOMATICALLY CATEGORIZE SOCIAL MEDIA POSTS AND RECOMMEND SOCIAL MEDIA POSTS

BACKGROUND

This disclosure is directed to systems and methods for recommending a social media post. In particular, techniques are disclosed for generating recommended social media posts for user selection that are relevant to other social media posts (e.g., being viewed by the user on a social media platform).

SUMMARY

In recent years, the proliferation of social media has had a profound impact on society, changing the way users interact and communicate with each other. Various social media platforms (e.g., Instagram®, Facebook®, Snapchat®, LinkedIn®, etc.) allow users to interact over a computer network with users in other parts of the world. Social media platforms may permit a user to create a profile, and users often associate the profile with their given names so as to be easily identifiable to friends, family, colleagues, etc. Thus, as each user is likely to be concerned about his or her reputation on the platform, users may wish to post creative and/or thoughtful posts on the platform relevant to conversations or messages involving other users. However, a user may not have a strong command of the language (e.g., English) associated with text or images of the other posts, or the user may not be technologically savvy (e.g., have difficulty typing), and thus may struggle to come up with a creative and/or thoughtful post that contributes to a social media conversation. In some circumstances, the user may even resort to time-consuming tasks of searching the web in an effort to come up with a creative post, or might search through his or her social media profile or local device drive in an effort to find an image that is relevant to the conversation on the social media platform. The user may waste a lot of time trying to find the content for the post and may eventually become frustrated and decide not to post anything. Moreover, even if the user ultimately is able to find desirable text and/or images for the post, the user may be frustrated with the amount of time he or she spent on the activity and might be less likely to spend time on the social media platform. As another example, a user may wish to thoughtfully respond to a post in a particular language (e.g., Arabic), but since the user may not be proficient in such language, the user may be unable to do so.

To overcome these problems, systems and methods are provided herein for generating recommended social media posts for user selection, by identifying one or more content categories associated with a first social media post by a first user, parsing one or more social media posts (associated with the first social media post) by one or more other users, and generating for presentation to a second user, based on the one or more identified content categories of the first social media post and the one or more parsed social media posts, one or more recommended social media posts for the second user. The system may determine whether selection of a recommended social media post of the one or more recommended social media posts has been received from the second user, and in response to determining that selection of the recommended social media post has been received, generate a second social media post (corresponding to the recommended social media post) and associated with the first social media post. In one example, the recommended social media post may be topically related to the first post (e.g., an original post in the thread) and at the same time may semantically match posts from other users, yet expressed in a different way than such posts (e.g., so the user is not merely re-posting a repeat comment or image that another user already posted within a social media conversation).

In some aspects of this disclosure, parsing the one or more social media posts by the other users comprises determining whether at least one of the one or more social media posts contains a text string, and in response to determining that at least one of the one or more social media posts contains a text string, performing natural language processing on the text string. In order to generate for presentation to the second user the one or more recommended social media posts, the system may generate a query based on the natural language processing of the text string and forward the query to a database to retrieve a candidate text string. A recommended social media post of the one or more recommended social media posts may be generated based on the retrieved candidate text string, and such recommended social media post may semantically match at least one of the one or more social media posts by the one or more other users.

In some embodiments, one or more trained machine learning models may be used to perform the natural language processing and generate the query. The one or more machine learning models may be trained to learn vector representations of words, and the vector representations may be used to compute semantical similarity between the text string and the candidate text string.

In some embodiments, the system may determine a first language associated with a profile of the second user, and whether the first social media post includes a text string in a second language different from the first language. In response to determining that the first social media post includes the text string in the second language, the system may cause a recommended social media post to include a text string in the second language, and the text string in the second language may be presented together with a translation into the first language of the text string in the second language.

In some aspects of this disclosure, parsing the one or more social media posts by the other users comprises determining whether at least one of the one or more social media posts contains an image and identifying one or more content categories associated with the image. In generating for presentation to the second user the one or more recommended social media posts, the system may retrieve an image associated with the one or more content categories and provide the retrieved image as a recommended social media post. The retrieved image may be retrieved from a local device of the second user, a social media profile associated with the second user, or a remote server.

In some embodiments, identifying the one or more content categories associated with the first social media post further comprises determining a location associated with the first social media post.

Each of the first social media post, the one or more other social media posts, and the second social media post may be included in a same social media thread within a social media platform. For example, the first social media post may be an original post of the thread and may be posted at a first time, the one or more other social media posts may be posted at respective times after the first time, and the second social media post may be posted at a second time after the first time and the respective times.

In some aspects of this disclosure, the one or more content categories associated with the first social media post may be identified using a trained machine learning model.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
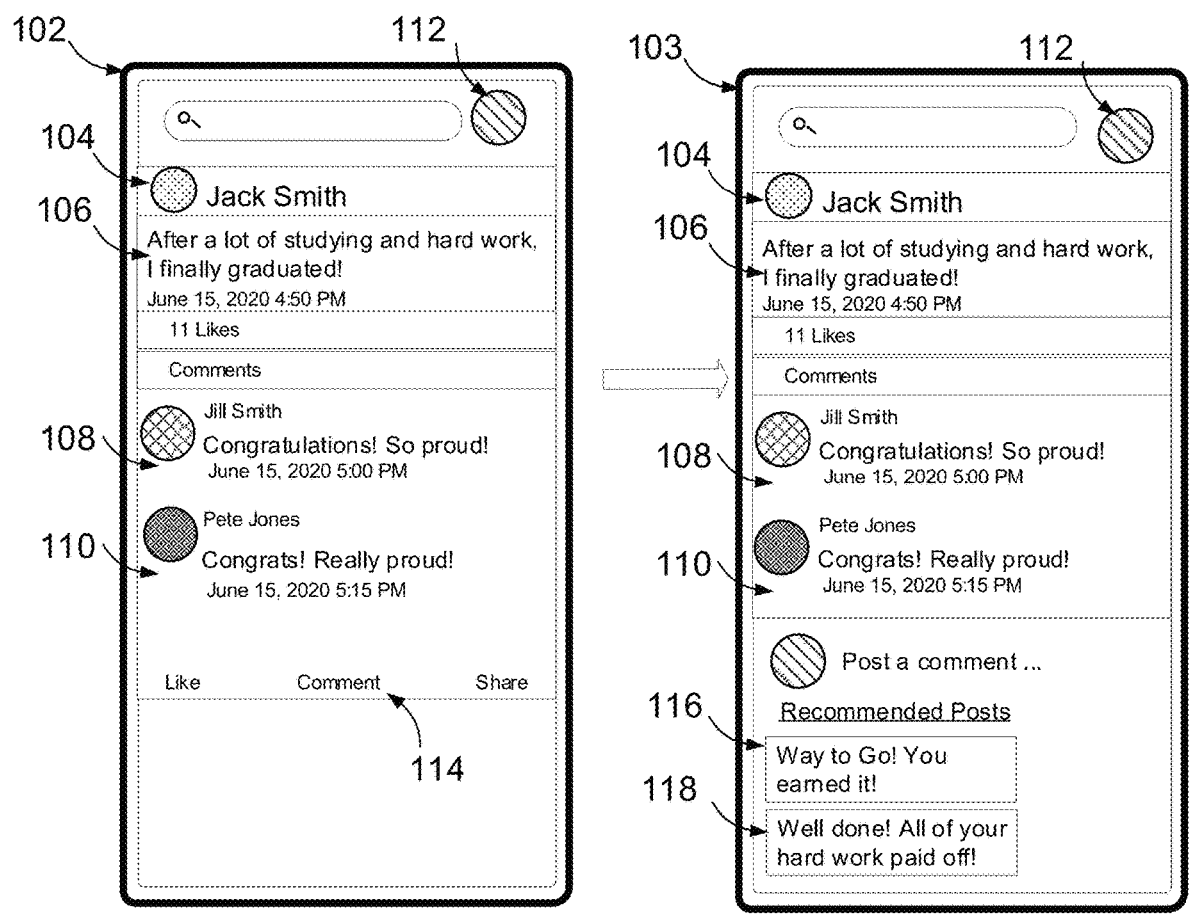
FIG. 1 shows an example of generating for presentation recommended social media posts, in accordance with some embodiments of this disclosure.

FIG. 1 shows exemplary display screens 100 (e.g., provided by a social media application, implemented at least in part on a user device) that are provided on a display of a user device. For example, user 112 may be scrolling, or otherwise navigating, through a media feed or timeline provided by the social media application associated with a social media platform. In display 102, user 104 ("Jack Smith") posted a message 106 containing a text string indicating he has graduated, and various other users (e.g., "Jill Smith" and "Pete Jones") have posted respective comments 108, 110 in response (e.g., congratulating user 104 on graduating). As shown in display 103, upon receiving selection of "Comment" option 114 from user 112, the system may determine that user 112 would also like to post a comment associated with the conversation thread, such as to respond to original post 106 by user 104. In some circumstances, user 112 may also wish to congratulate user 104 for graduating and/or show his or her support for user 104, but may be struggling to come up with the right post that captures how the user is feeling in a creative and/or thoughtful way. For example, user 112 may wish to congratulate user 104 in a similar fashion or convey a similar message as that in posts 108, 110 by the other users, but not merely repeat what such users posted. Accordingly, the system may generate for display, based on original post 106 and posts 108, 110 associated with original post 106, recommended or suggested posts 116, 118 for selection by user 112. For example, recommended posts 116, 118 may convey the same general message as posts 108, 110, but may be expressed in a different way in order to differentiate the post by user 112 (e.g., to allow user 112 to stand out from the other users, rather than merely imitating or copying posts by other users). For example, the system may perform natural language processing to extract keywords from the prior posts (and/or images, metadata, or other information) to analyze such posts, and use such information in generating recommended posts. Upon receiving selection of a recommended post (e.g., post 116) by user 112, the social media application may present the selected recommended post 116 or 118 as an additional message in the thread of messages (e.g., such that the thread includes posts 106, 108, 110, 116).

Figure 2:
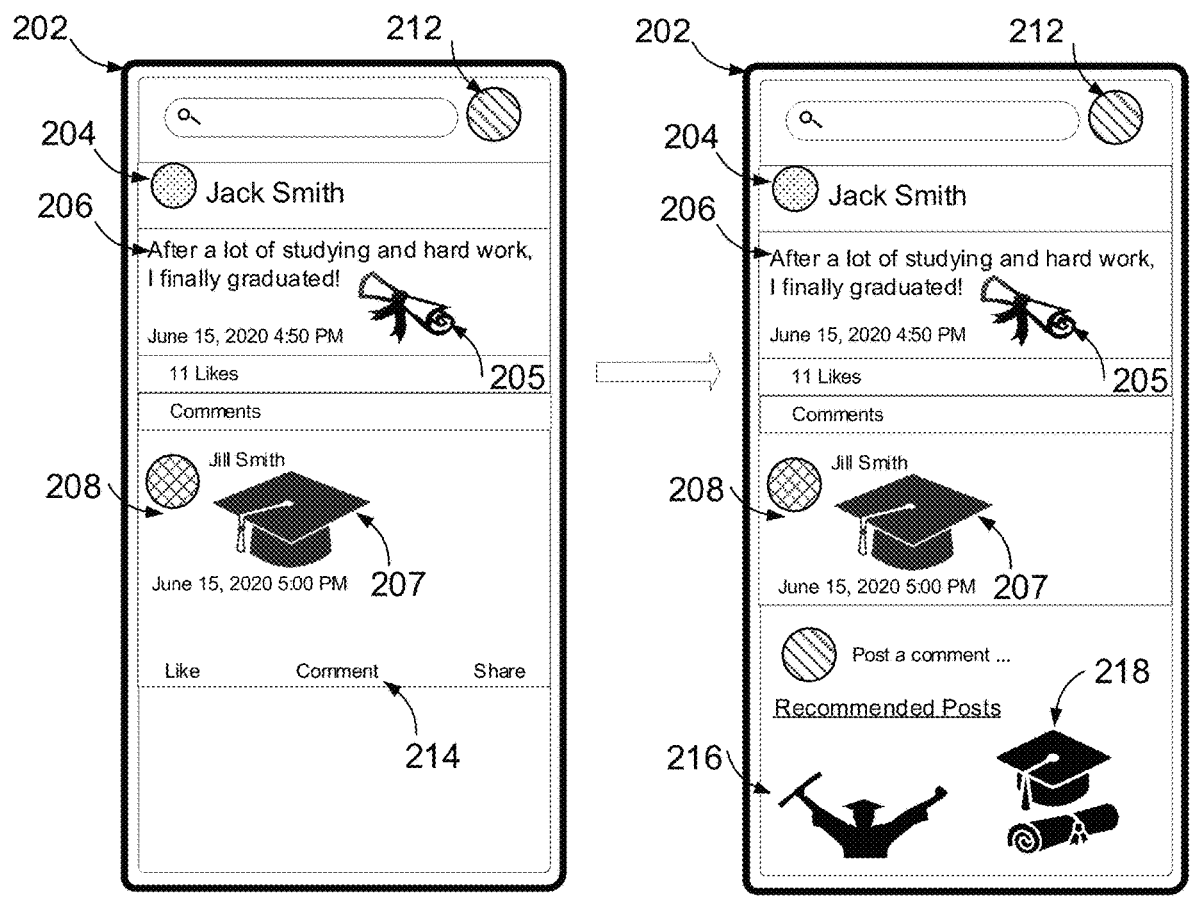
FIG. 2 shows an example of generating for presentation recommended social media posts including images, in accordance with some embodiments of this disclosure.

FIG. 2 shows exemplary display screens 200 illustrating original post 206 received by from user 204, where original post 206 contains an image. In display 202, post 206 by user 204 may contain image 205 (e.g., a graduation diploma) which may or may not be accompanied by text (e.g., related to user 204 announcing that he has graduated). Post 208 received from a user ("Jill Smith") may include image 207 (e.g., a graduation cap), that is related to the graduation announcement of post 206 by user 204. In some embodiments, user 212 may come across this conversation or thread in his or her social media newsfeed or timeline and may desire to contribute to the conversation or congratulate user 204, but may be struggling to come up with an appropriate post. Upon receiving selection of "Comment" option 214 from user 212, the system may generate recommended posts 216, 218 for the user. For example, the system may determine, based on one or more of image 205 included in original post 206 and image 207 included in subsequent post 208, appropriate images to provide to user 212 as recommended posts. For example, the system may provide images which are topically related to one or more of image 205, 207, but different from such images, to avoid the appearance that user 212 is merely re-posting an image already posted on the thread or conversation. Upon receiving selection of a recommended post (e.g., post 216) by user 212, the social media application may present the selected recommended post 216 or 218 as an additional message in the thread of messages (e.g., such that the thread includes posts 206, 208, 216). Those of skill in the art will appreciate that the content included in any of the posts (and any of the recommended posts) may be any type of content (e.g., text, image, video, GIF, audio, or any combination thereof, etc.), and each content item in the social media post may be suitably analyzed in generating a recommended social media post.

Figure 3:
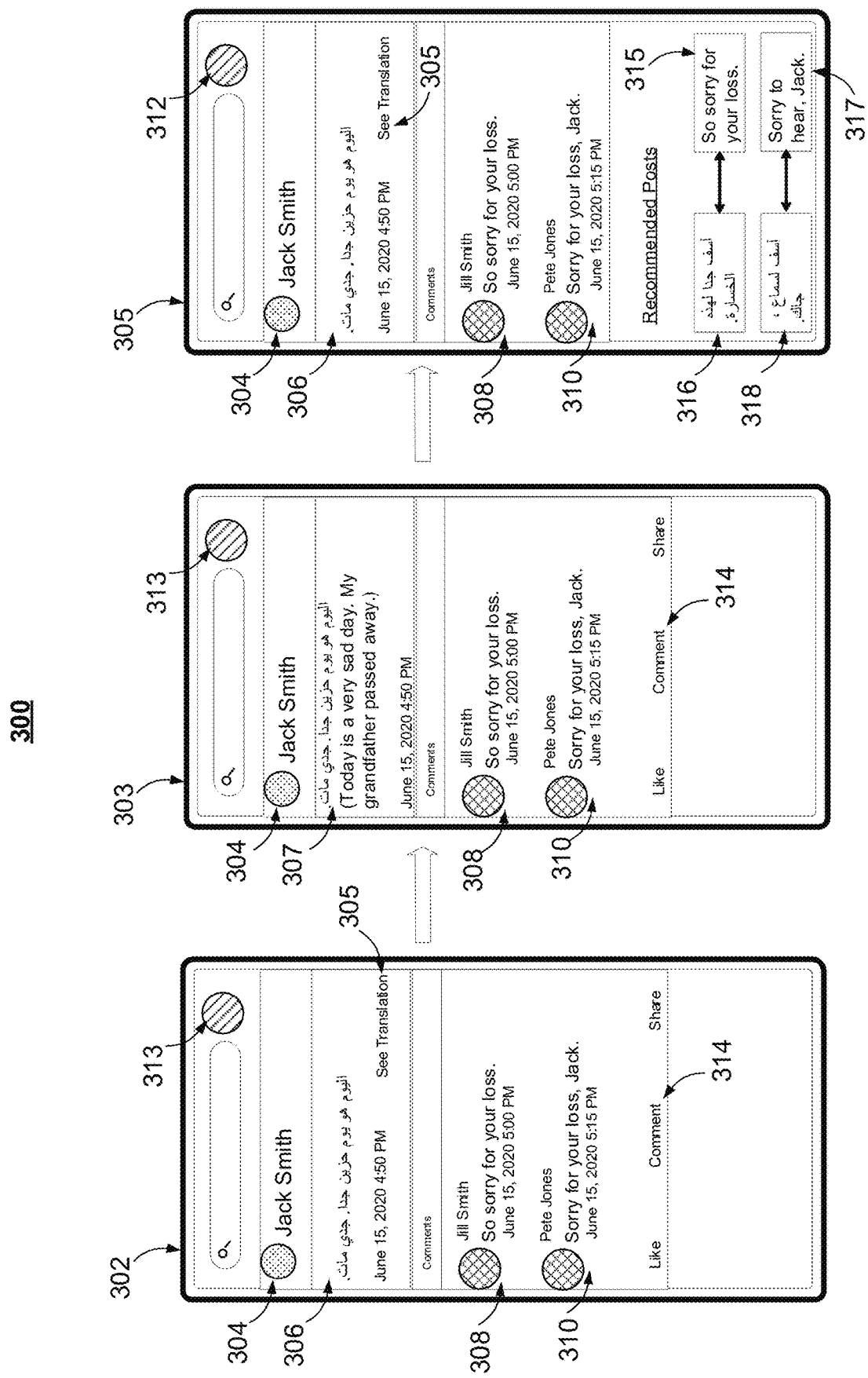
FIG. 3 shows an example of generating for presentation recommended social media posts in different languages, in accordance with some embodiments of this disclosure.

In some embodiments, a language of one or more posts on the social media platform may be considered by the system when generating recommended posts to a user. For example, FIG. 3 shows exemplary displays 300 in which user 304 has posted original post 306 in a particular language (e.g., Arabic). Those of skill in the art will appreciate that the language of the post may be in any language. The system may generate translation 307 of original post 306 (e.g., in response to receiving selection of option 305 on display 302) to a language understandable to a user (e.g., determined based on preferences included in a user profile with the social media platform, based on user behavior, etc.). In display 302, posts 308, 310 received from other users offer condolences to user 304 in a different language (e.g., English) than post 306 (e.g., Arabic) received from user 304. However, it may be more meaningful to user 304 if he or she viewed posts in the same language as original post 306.

Accordingly, the system may generate recommended posts 316, 318, which may offer condolences in the same language as the original post 306, and may additionally present translated versions 315, 317 of such posts to user 312 so that user 312 is aware of what he or she is posting (e.g., if recommended post 316 or 318 is selected by the user). The translated versions 315, 317 of recommended posts 316, 318 need not be presented in the social media conversation when user selection of post 316 or 318 is received.

In some embodiments, the system may generate as the recommended posts translated versions of posts 308, 310, semantically similar versions of posts 308, 310 but in the language of the original post, and/or commonly used text strings (e.g., from a religious text associated with the language of the user, such as passages that are commonly used in the context of the original post). In some embodiments, artificial intelligence models (e.g., neural networks) may be used to classify text into a particular language and perform machine translations of the text in the source language into a target language. Such models may be incorporated in the system and/or provided by the social media platform (or provided by external providers such as Google® translate). For example, such models may be trained with translated sentence pairs in a plurality of languages.

Figure 4:
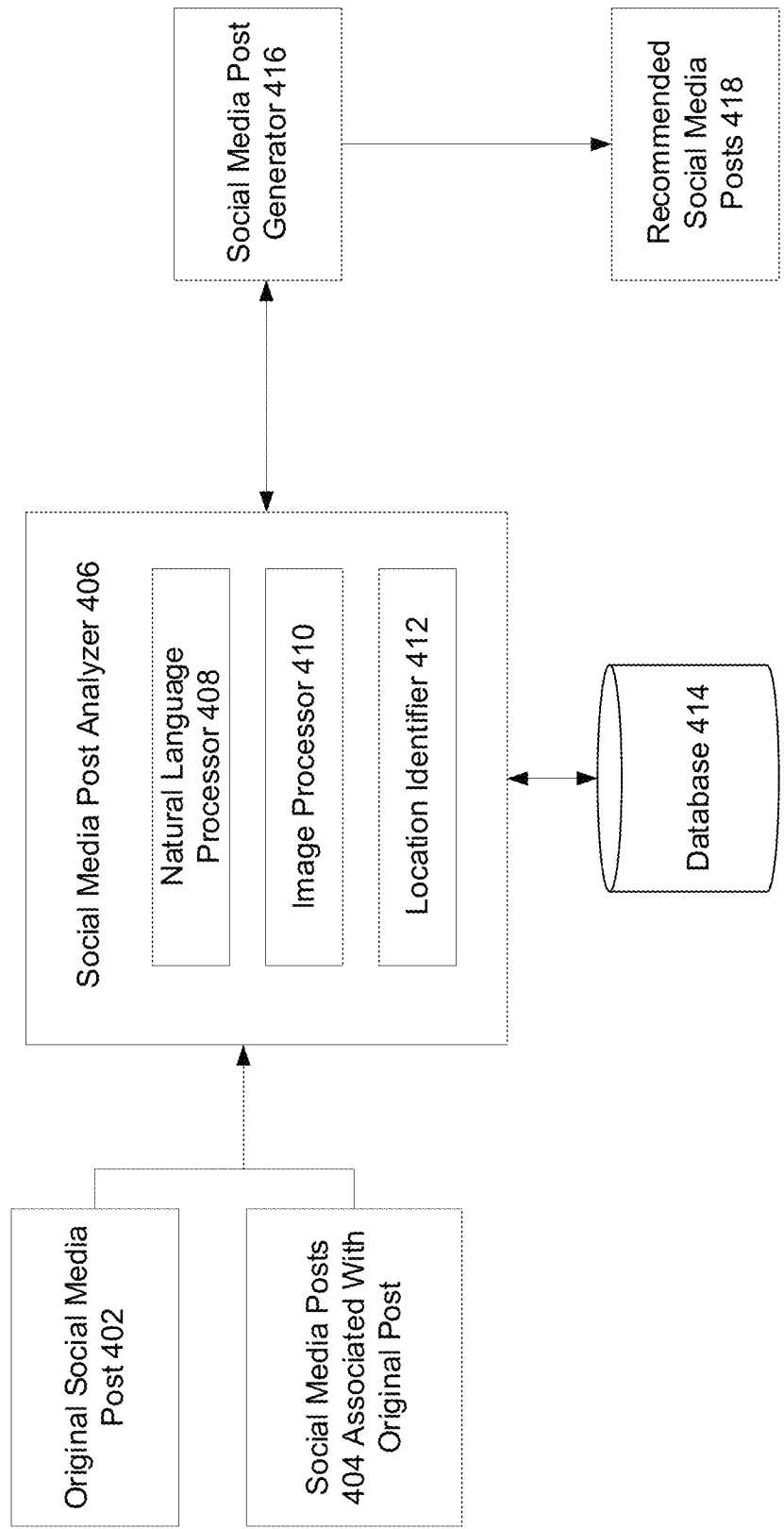
FIG. 4 shows a block diagram of an illustrative system for generating for presentation recommended social media posts, in accordance with some embodiments of this disclosure.
Figure 5:
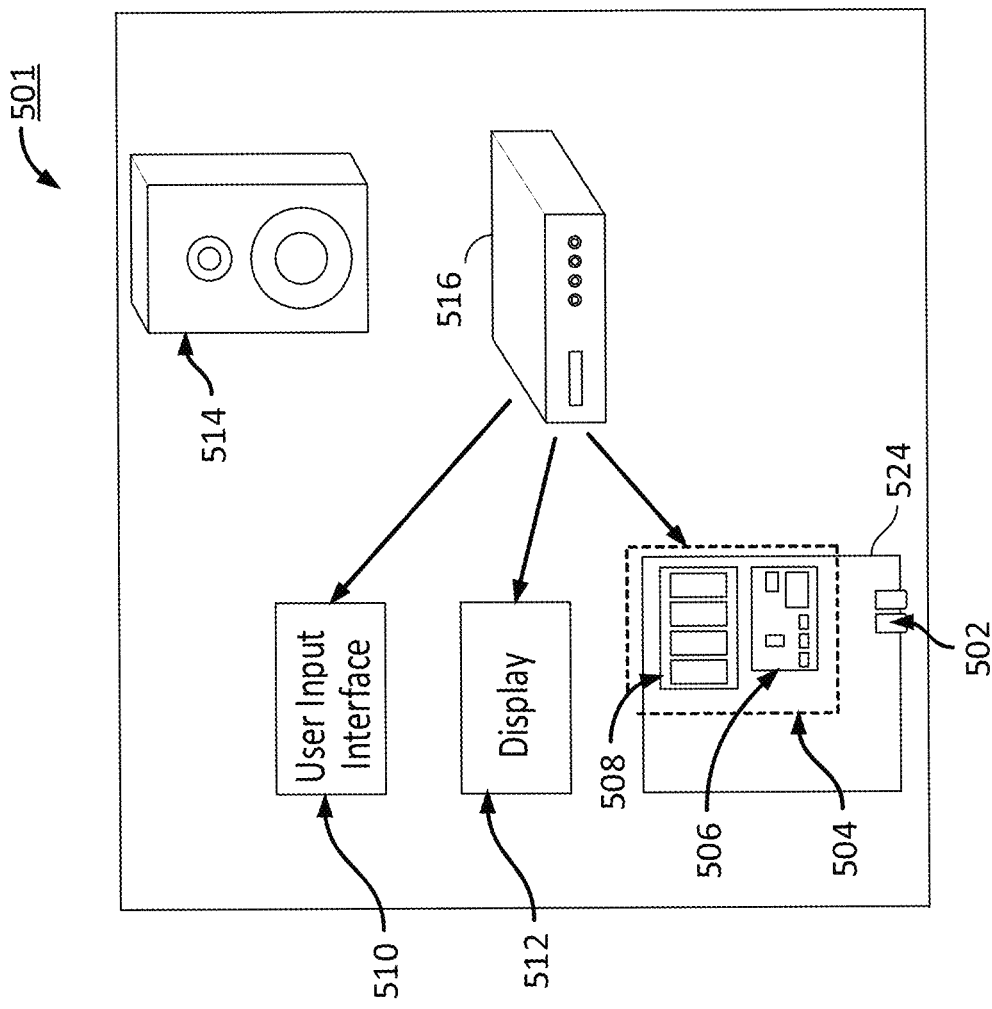
FIG. 5 shows a block diagram of an illustrative user device, in accordance with some embodiments of this disclosure.
Figure 5:
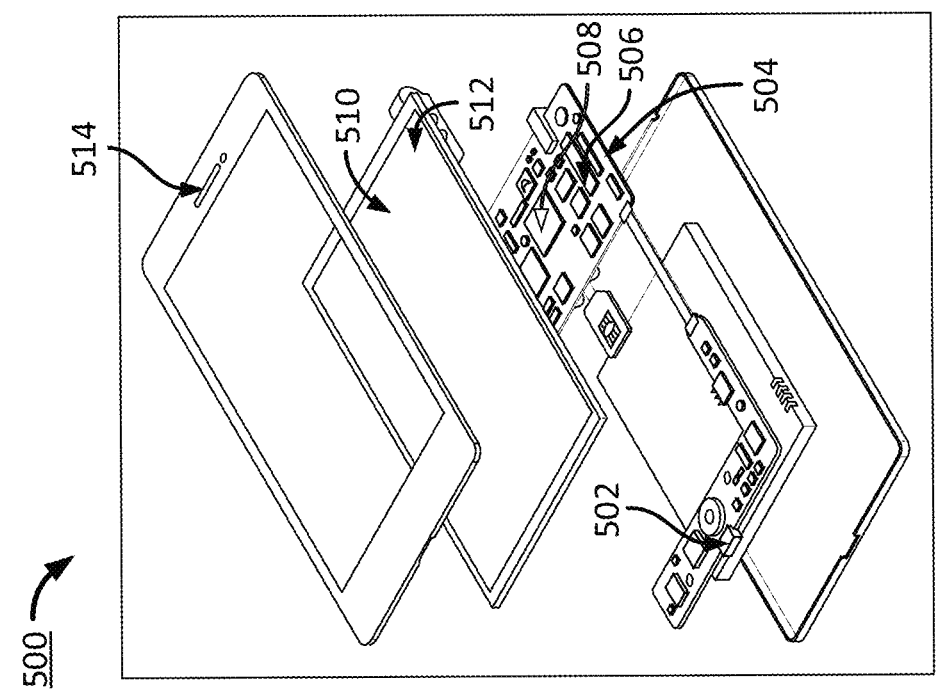

FIG. 4 shows a block diagram of an illustrative system 400 for generating for presentation recommended social media posts, in accordance with some embodiments of this disclosure. As illustrated, system 400 includes social media post analyzer 406, which receives original social media post 402 (e.g., post 106 in FIG. 1; post 206 in FIG. 2; post 306 in FIG. 3) and may receive one or more posts (e.g., posts 108, 110 in FIG. 1; post 208 in FIG. 2; posts 308, 310 in FIG. 3) associated with original post 402 (e.g., in response to and/or as part of the same conversation thread and/or otherwise related to the original post). Social media post analyzer 406 may include natural language processor 408, image processor 410, and location identifier 412 to process the received social media posts 402, 404. Based on the processing, the social media posts 402, 404 may be parsed and categorized (e.g., assigned one or more data tags by social media post analyzer 406), and social media post generator 416 may generate one or more recommended social media posts 418 based on such categorizations. System 400 may be implemented on a single computing device or may be implemented using more than one computing device, and any combination of hardware and or software modules operating within a computing device (e.g., user device 500, 501 as shown in FIG. 5, and/or devices 602, 605, 606 of FIG. 6, and/or server 608 of FIG. 6).

Natural language processor 408 may perform natural language processing (NLP) on any text contained in the received social media posts 402, 404. In some embodiments, rule-based NLP techniques or algorithms may be employed to parse text strings included in social media posts 402, 404. For example, NLP circuitry or other linguistic analysis circuitry may apply linguistic, sentiment, and grammar rules to tokenize words from a text string; identify parts of speech (i.e., noun, verb, pronoun, preposition, adverb, conjunction, participle, article); perform named entity recognition; and identify phrases, sentences, proper nouns, or other linguistic features of the text string. In some embodiments, social media post analyzer 406 may categorize posts with one or more data tags (e.g., as Social/Happy/Wedding) by extracting or analyzing entities or keywords (e.g., wedding, anniversary, dress) from a text string in a post and compare the extracted keywords to historical posts (and/or metadata tags associated therewith), which may be stored in a database record of database 414. If the social media posts 402, 404 contain one or more images, natural language processor 408 may analyze any text that may be included in the image or metadata associated with the image (e.g., metadata tags or identifiers), text that accompanies the image (e.g., a caption, note or message), any other suitable text associated with a content item, or any combination thereof.

In some embodiments, statistical NLP techniques may be employed, and natural language understanding (NLU) analytics may be used to identify and parse text. In some natural language recognition models, grammar induction and grammar inference algorithms, such as context-free Lempel-Ziv-Welch algorithm or byte-pair encoding and optimization, may be employed. Lemmatization tasks may be employed to remove inflectional endings, morphological segmentation may be performed to separate words into individual morphemes and identify the class of morphemes, part-of-speech tagging (e.g., using SpaCy, a Python library for advanced NLP), dependency parsing, parsing, semantic role labeling, sentence boundary disambiguation, stemming, word segmentation, sentence segmentation, terminology extraction, and other suitable natural language recognition techniques. In example embodiments, natural language recognition processes may be implemented with algorithms such as hidden Markov model, dynamic time warping, and artificial neural networks. The system may use additional features, e.g., non-destructive tokenization, named entity recognition (e.g., persons, things, products, organizations, time, money, locations, etc.), statistical models for multiple languages, pre-trained word vectors, labelled dependency parsing, syntax-driven sentence segmentation, text classification, built-in visualizers for syntax and named entities, and/or deep learning integration.

Natural language processor 408 may utilize a machine learning model that may output a value, a vector, a range of values, any suitable numeric representation of classifications of content (e.g., text, image, video, audio), or any suitable combination thereof. For example, the machine learning model output may be one or more classifications and associated confidence values, where the classifications may be any categories into which content may be classified or characterized (events, persons, genres, products, objects, etc.). Various machine learning models (e.g., naive Bayes algorithm, logistic regression, recurrent neural network, bi-directional long short-term memory recurrent neural network model (LSTM-RNN), etc.) may be used to classify content (e.g., text strings, images, video, etc.) and/or to perform sentiment analysis. Machine learning models may be trained in any suitable manner to generate the types or categories of classifications. For example, a corpus of text (e.g., a plurality of social media conversations including multiple posts labeled and/or tagged with data tags, which may be stored in database 414) may be used to train the machine learning model. The model may be trained in a supervised fashion on a set of training sequences by using machine learning techniques (e.g., gradient descent and backpropagation). The described optimization may compute gradients to change one or more weights of the model. For example, unnecessary or irrelevant recommendations, which indicate errors in the weights, may be looped in a feedback loop using machine learning techniques (e.g., gradient descent and backpropagation) through the model to generate one or more optimized weights. Training of natural language models is discussed in more detail in connection with application Ser. No. 16/805,307, filed Feb. 28, 2020, which is hereby incorporated by reference herein in its entirety.

Image processor 410 may, in the event one or more of social media posts 402, 404 contain an image or a video, perform object or pattern recognition techniques, and/or edge detection or computer vision techniques on images and videos to identify people, places, things, events, any other suitable objects, or any combination thereof, depicted therein. In an illustrative example, image processor 410 may identify an image of the Eiffel tower in Paris, France, by analyzing metadata associated with the image, and/or performing landmark identification based on extracted background and/or object features and comparing the features with features in database 414 (or stored on another remote server or locally). In some embodiments, machine learning models (e.g., native Bayes model, logistic regression, neural networks, etc.) may be employed to classify images. For example, the model may be trained on a plurality of labeled image pairs, where image data may be preprocessed and represented as feature vectors.

Location identifier 412 may identify and analyze geographic information (e.g., a GPS tag or other location tag) associated with one or more of the social media posts 402, 404 (e.g., indicated by a user "checking-in" to the location on a social media platform, extracted from metadata, based on content and/or context of a post, etc.). Location information may additionally or alternatively be retrieved from a social media profile of the relevant user (e.g., a location listed in the bio-page of the user or a social media post indicating location), metadata of media uploaded to a website by the user (e.g., a location found in the metadata of a photo the candidate user uploaded online), a message on the device received from the user (e.g., a text message or email indicating the location of the user, etc.). For example, the system may determine that a user is on vacation if the user has indicated his or her location (e.g., via a post or as detected by GPS) as Amsterdam, but the user's home location associated with his or her profile is California. In this circumstance, social media post generator 416 may recommend a social media post using a vacation tag (e.g., by recommending a suitable post such as "Greetings from Amsterdam!" or "Congrats from Amsterdam").

In some embodiments, the system analyzes other attributes of social media posts, e.g., storage information (e.g., in which database content is stored, which service provides/hosts the content, formatting information), usage information (e.g., popularity, number of views, number of shares), content attributes (e.g., visual attributes, image quality, video quality, content datafile size), any other suitable information associated with the content, or any combination thereof.

In classifying the one or more social media posts 402, 404, and generating tags or other suitable metadata for storage, social media post analyzer 406 may reference database 414. For example, database 414 may include reference information against which the post may be compared. Reference information may include templates or other references against which the post may be compared, and/or keywords or tags based on tagged and labeled data (e.g., historical social media posts from one or more other platforms, transcripts of human conversations, etc.). For example, an historical original post from a social media platform may be categorized in a content category and be stored in association with one or more posts associated with the original post (e.g., a conversation thread), which may also be appropriately tagged and/or labeled (e.g., in metadata associated with the post). Database 414 may be queried with an appropriate SQL command. For example, social media post analyzer 406 may generate a database query based on the parsed social media posts, in an appropriate format to query database 414 for similar posts (e.g., topically and/or semantically similar posts to posts 402, 404). In some embodiments, social media post analyzer 406 may compare tags with a plurality of templates in database 414 that may include respective keywords in order to identify a similar template. Systems and methods for interpreting natural language search queries are discussed in more detail in connection with application Ser. No. 16/807,415, filed Mar. 3, 2020, which is hereby incorporated by reference herein in its entirety.

Results of the classification or categorization, and/or content that has undergone analysis of social media post analyzer 406 and/or social media post generator 416, may be stored in database 414 (e.g., to update database 414). Database 414 may be implemented on any suitable hardware, which may be the same as or different from hardware or devices in which social media post analyzer 406 is implemented. Database 414 may be configured to store information in any suitable format, arranged in any suitable arrangement, in accordance with the present disclosure. In some embodiments, database 414 may be stored as a single database (e.g., database 609 of FIG. 6), or implemented on one or more devices or as separate databases stored on the same hardware or different hardware. In some embodiments, database 414 includes an information graph, which includes information about a plurality of entities related to each other, and/or subject-matter, location, attributes, or any other suitable information related to social media posts. Entity information may be an identifier for an entity, details describing an entity, a title referring to the entity, phrases associated with the entity, links (e.g., IP addresses, URLs, hardware addresses) associated with the entity, keywords associated with the entity (e.g., tags or other keywords), any other suitable information associated with an entity, or any combination thereof. In some embodiments, the system may use semantic graphs in combination with machine learning to gain a deeper understanding of content, quickly identifying relevant entities/keywords based on context.

Social media post generator 416 may be configured to generate one or more recommended social media posts 418 for selection by a user, based on one or more of social media posts 402, 404. For example, social media post generator 416 (and/or social media post analyzer 406) may be configured to generate recommended social media posts 418 by accessing database 414 and identifying posts in database 414 that are similar to the social media conversation of interest and recommending such posts (with or without modifying the post prior to recommending the post), identifying relevant templates for posts in database 414 and populating the templates, finding semantically similar posts (e.g., based on word and/or sentence embeddings), generating an appropriate response based on machine learning techniques, performing a web crawl (e.g., for relevant text or images), searching the social media profile of the user for suitable content, searching a local device of the user suitable content, and/or accessing a machine translation tool. In some embodiments, social media post analyzer 406 and social media post generator 416 are a single module. In some embodiments, as social media post generator 416 generates increasing numbers of recommended posts, the set of information may be used to inform further recommendations (e.g., using machine learning, data analysis techniques, statistics, heuristics, etc.).

In some embodiments, social media post generator 416 may query database 414 for social media posts or other content having matching keywords and/or tags and retrieve and rank candidate posts to be recommended. The system may reference predetermined sequences or parts of speech stored in database 414, and/or include one or more machine learning models trained to recognize similar sequences of text or parts of speech. For example, social media post generator 416 may identify a sequence of parts of speech, compare the sequence against known query types, and identify the query type that most closely matches. Social media post analyzer 406 and/or social media post generator 416 may query database 414 for historical conversations in which keywords associated with an original social media post match keywords extracted from original social media post 402, and keywords associated with subsequent responses in the historical conversation thread match keywords extracted from social media posts 404. If a match is found (e.g., a computed similarity score is determined to be above a predetermined threshold), one or more posts from the historical conversation determined as most probable to be relevant may be recommended to the user, or may be suitably modified before being recommended to the user. In some embodiments, sequences of words, phrases or sentences, or sentence structure may be identified that matches predetermined criteria with some probability.

Additionally or alternatively, social media post generator 416 may search among reference information to identify similar templates to social media posts 404 (e.g., that include the same or similar features or parts of speech). For example, for the data tag "wedding", database 414 may store a linked template of "I wish you all the best! You guys are perfect for each other!", which may be inputted or extracted from past social media post records. In some embodiments, social media post generator 416 may modify the posts or templates retrieved prior to providing the post as a recommended post. For example, social media post generator 416 may conform the retrieved post or template to the current social media conversation of interest by substituting appropriate names or dates associated with users and posts in the social media conversation, or augment the post with text, images or emoticons. In some embodiments, a template includes instructions, criteria, or other features by which the system may determine how to format a message, determine a format of a message, or both. In some embodiments, social media post generator 416 may retrieve a template word string and modify the template by substituting synonyms, one or more words and/or phrases for text in social media posts 404 or other suitable modifications, or retrieve a template image and perform modifications to the template image. As another example, social media post generator 416 may determine a context of a message (e.g., holiday-related) and may select a template that includes holiday-themed text, images or video to be included in the recommended post.

In some embodiments, as shown in FIG. 4, social media post generator 416 may modify text (e.g., included in one or more of social media post 402, 404, or retrieved from database 414) by translating the text into a suitable language. For example, social media post generator 416 may determine that original post 402 is in Arabic, and that subsequent posts 404 on the social media thread are in the English language. Social media post generator 416 may also determine that a primary language associated with a user profile of the user or behavior of the user is a different language from that of original post 402. In this situation, social media post generator 416 may generate recommended posts translated into the language of original post 402 (e.g., Arabic). The recommended posts may have a meaning that is similar to or the same as the posts 404 except the recommended posts may be translated into language of original post 402 (e.g., Arabic). In some embodiments, the social post media generator 416 may additionally retrieve relevant images to be included in the recommended post (e.g., an image relevant to the culture associated with the language).

In some embodiments, in order to generate and/or retrieve a text string for recommended social media post 418, social post media generator 416 may reference and/or incorporate a semantical database to determine similarity between words (e.g., the WordNet dataset, which specifies synonyms, parts of speech, hyponyms, etc., or the Stanford Contextual Word Similarity dataset). For example, by referencing such a database, the system may recommend the word "Kudos!" to be substituted for "Congratulations!" in a recommended social media post 418, such as in a circumstance where one or more of social media posts 404 includes the word "Congratulations!". Additionally or alternatively, a database indicating similarity scores as between words may be referenced (e.g., the SimLex-999 dataset or the WordSim-353 dataset).

In some embodiments, database 414 may include a library of various phrases or sentences previously tagged as being semantically similar or identical, which may be leveraged by social media post generator 416 in recommending posts 418.

In some embodiments, vector semantics may be employed to facilitate the recommendation of social media posts. For example, models driven by statistical methods such as term frequency-inverse document frequency (TF-IDF) may be employed to reflect how important a word is to a document in a collection or corpus. Such a model may be employed in retrieving (e.g., from database 414, or via a web crawl) content for similar posts to be recommended (e.g., retrieving historical posts with similar statistical features to posts 402, 404).

As another example, in generating and/or retrieving recommended social media posts 418, social media post analyzer 406 and/or social media post generator 416 may employ a word (or phrase or sentence) embedding machine learning model to recommend a semantically similar post (e.g., to posts 402 and/or 404). For example, a text corpus may be used to train a word embedding machine learning model, in order to represent each word as a vector in a vector space. In some embodiments, a Word2Vec machine learning model may be employed as the word embedding machine learning model. The Word2Vec model may contain plural models, one of which may be an unsupervised deep learning machine learning model used to generate vector representations (e.g., word embeddings) of words in a corpus of text used to train the model. The generated vectors are indicative of contextual and semantic similarity between the words in the corpus. In training the Word2Vec model, a neural network may be employed with a single hidden layer, where the weights of the hidden layer correspond to the word vectors being learned. Word2Vec may utilize the architectures of a Continuous Bag of Words model or a Continuous Skip-gram model to generate the word embeddings, as discussed in Mikolov et al., Efficient Estimation of Word Representations in Vector Space, ICLR Workshop, 2013, which is hereby incorporated by reference herein in its entirety. A cosine similarity operation as between respective angles may be used to determine the similarity between words.

To determine the similarity between sentences or phrases in social media posts, social media post analyzer 406 and/or social media post generator 416 may perform operations on word embeddings included in the phrase or sentence (e.g., compute an average or weighted average of word vectors in the sentence), and perform a cosine similarity operation as between the computed vectors to determine sentence similarity. In some embodiments, one or more machine learning models may be used by the system to obtain sentence or phrase embeddings of social media posts, such as discussed in Le et al., "Distributed Representations of Sentences and Documents", In Proceedings of the 31st International Conference on Machine Learning, PMLR 32(2):1188-1196, 2014, which is hereby incorporated by reference herein in its entirety. In some embodiments, a machine learning model may return a similarity score as between two sentences. The model may be trained using labeled sentence pairs (e.g., assigned similarity scores by human reviewers and/or confidence scores). Various machine learning models may be employed for this task (e.g., recurrent neural networks, bidirectional recurrent neural networks, LSTM-RNN models, encoder-decoder models, transformers, etc.). The model may be pretrained (e.g., utilize the embedded words in the Word2Vec model) or the embeddings may be learned during training of the model. In some embodiments various other algorithms may be employed in text classification and/or comparison, such as Bidirectional Encoder Representations from Transformers (BERT), as discussed in Devlin et al., BERT: Pre-training of Deep Bidirectional Transformers for Language Understanding, In Proceedings of NAACL-HLT 2019, pages 4171-4186, which is hereby incorporated by reference herein in its entirety.

In some embodiments, word and/or sentence embeddings may be leveraged to allow for semantic (and/or syntactic) queries of database 414. For example, the embedded word representations in the Word2Vec model may be incorporated into database records of database 414, to enable database 414 to be queried for words, phrases or sentences having similar embeddings to that of one or more of posts 402, 404. The system may employ cosine similarity calculations to return similar words, phrases or sentences (e.g., to those in social media posts 404) to be recommended to the user in a social media post. In some embodiments, social media post generator 416 may form a query for database 414 from content in social media posts 402, 404, and retrieve from database 414 candidate social media posts (e.g., ranked by frequency-weighted term overlap), and a post may be recommended based on a closest match (e.g., based on sentence structure and/or overlap of content).

In some embodiments, social media post generator 416 may generate text for recommended posts using NLP generation (e.g., using one or more machine learning models). For example, neural networks may be employed to generate text (e.g., using a technique such as autoregressive generation in conjunction with social media post context). In some embodiments, context-free grammar rules may be utilized in generating sentences. In some embodiments, an algorithm (e.g., the TF-IDF algorithm) may be used to summarize or paraphrase text from one or more of posts 402, 404, to be included in a recommended post. In some embodiments, machine translation pivot may be utilized (e.g., translating a phrase from one language to another and back) to paraphrase and/or reword text in a post.

In some embodiments, social media post generator 416 (and/or social media post analyzer 406) may retrieve relevant content to be included in recommended social media post 418 other than, or in addition to, text. For example, a post on a social media platform may include an image from a first user's wedding day (e.g., to commemorate a one-year anniversary), and in response the system may recommend to a second user relevant content (e.g., an image of the second user attending the first user's wedding, with or without recommended text string such as "That was a great day"). This image may be retrieved from a local device of the second user, a remote server, or the social media profile of the user. In some embodiments, a web crawler may be employed by the system to retrieve relevant content, as illustrated in FIG. 2. Such content may be an image that is relevant to one or more of social media posts 402, 404, but is not identical to such posts. For example, if one user posts an image depicting the Royal Wedding, the system may retrieve another related depiction of the Royal Wedding that is similar but not identical to the initial post.

In some embodiments, social media post generator 416 may compare generated recommended posts 418 to social media posts 404 (e.g., to ensure that the posts are semantically similar to, but nonetheless are presented differently, than social media posts 404) prior to providing the recommended post to the user, in order to validate the recommended posts. Additionally or alternatively, social media post generator 416 may generate a content category associated with generated recommended post 418 and compare the content category to the content category of original post 402 (e.g., to generate a relevance score), to verify that the generated post is sufficiently relevant to the social media conversation. In some embodiments, the validation may be performed by a discriminator that applies a machine learning model to validate the recommendation. The discriminator may apply analysis and comparisons to determine if generated recommended post 418 satisfies particular criteria pertaining to content of the post (e.g., to determine whether the recommended post sufficiently resembles semantical of the posts 404, while at the same time is presented differently than the posts 404 and is responsive and relevant to post 402). In some embodiments, the comparison may be word by word or character by character in the case of text, and may be pixel by pixel in the case of an image, and the validation decision may be based on a similarity and/or relevance score resulting from the comparison to a threshold score.

It will be understood that FIGS. 1-4 are shown for illustrative purposes and that not all of the features need to be included. In some embodiments, additional features may be included as well.

In some embodiments, the methods and systems described in connection with FIGS. 1-4 utilize one or more devices on which to output recommended social media posts to the user. FIG. 5 shows a generalized embodiment of such an illustrative device 500 or 501, in accordance with some embodiments of the present disclosure. As depicted, device 500 may be a smartphone or tablet, whereas device 501 may include equipment device 516 (e.g., a PC, set-top box, CPU, video-game console, etc.) powered by processor 524. Devices 500 and 501 may receive content and data via input/output (hereinafter "I/O") path 502 (e.g., I/O circuitry). I/O path 502 may provide content (e.g., Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O path 502 may additionally provide circuitry to control user interface 510. I/O functions may be provided by one or more of these communications paths but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions stored in memory (i.e., storage 508). Specifically, control circuitry 504 may be instructed by the application to perform the functions discussed above and below. For example, the application may provide instructions to control circuitry 504 to generate for display recommended social media posts. In some implementations, any action performed by control circuitry 504 may be based on instructions received from the application.

An application on a device may be a stand-alone application implemented on a device and/or at least partially on a server. The application may be implemented as software or a set of executable instructions. The instructions for performing any of the embodiments discussed herein of the application may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 5 the instructions may be stored in storage 508, and executed by control circuitry 504 of device 500.

In some embodiments, an application may be a client-server application where the client application resides on device 500 (e.g., device 602), and a server application resides on an external server (e.g., server 606). For example, an application may be implemented partially as a client application on control circuitry 504 of device 500 and partially on the server as a server application running on control circuitry. The server may be a part of a local area network with the device, or may be part of a cloud-computing environment accessed via the internet. In a cloud-computing environment, various types of computing services for performing searches on the internet or informational databases, gathering information for a display (e.g., information for recommending social media posts via a display of an application), or parsing data are provided by a collection of network-accessible computing and storage resources (e.g., server 606), referred to as "the cloud." Device 500 may be a cloud client that relies on the cloud-computing capabilities from the server to gather data to populate an application. When executed by control circuitry of the server, the system may instruct control circuitry 504 to generate for display the recommended social media posts and transmit the recommended social media posts to device 500. The client application may instruct control circuitry of the receiving device 500 to generate the recommended social media posts for output. Alternatively, device 500 may perform all computations locally via control circuitry 504 without relying on the server.

Control circuitry 504 may include communications circuitry suitable for communicating with a content server or other networks or servers. The instructions for carrying out the above-mentioned functionality may be stored and executed on a server (e.g., server 606 of FIG. 6). Communications circuitry may include a cable modem, a wireless modem for communications with other equipment, or any other suitable communications circuitry. Such communications may involve the internet or any other suitable communication network or paths. In addition, communications circuitry may include circuitry that enables peer-to-peer communication of devices, or communication of devices in locations remote from each other.

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, or any other suitable fixed or removable storage devices, and/or any combination of the same. Non-volatile memory may also be used (e.g., to launch a boot-up routine and other instructions). Cloud-based storage (e.g., on server 606) may be used to supplement storage 508 or instead of storage 508.

Control circuitry 504 may include display-generating circuitry and tuning circuitry, such as one or more analog tuners, one or more MP3 decoders or other digital decoding circuitry, or any other suitable tuning or audio circuits or combinations of such circuits. Encoding circuitry (e.g., for converting over-the-air, analog, or digital signals to audio signals for storage) may also be provided. Control circuitry 504 may also include scaler circuitry for upconverting and down-converting content into the preferred output format of the device 500. Circuitry 504 may also include digital-to-analog converter circuitry and analog-to-digital converter circuitry for converting between digital and analog signals. The tuning and encoding circuitry may be used by the device to receive and to display, to play, or to record content. The tuning and encoding circuitry may also be used to receive guidance data. The circuitry described herein, including for example, the tuning, audio generating, encoding, decoding, encrypting, decrypting, scaler, and analog/digital circuitry, may be implemented using software running on one or more general purpose or specialized processors. Multiple tuners may be provided to handle simultaneous tuning functions. If storage 508 is provided as a separate device from device 500, the tuning and encoding circuitry (including multiple tuners) may be associated with storage 508.

A user may send instructions to control circuitry 504 using user input interface 510 of device 500, 501. User input interface 510 may be any suitable user interface touchscreen, touchpad, or stylus and may be responsive to external device add-ons such as a remote control, mouse, trackball, keypad, keyboard, joystick, voice recognition interface, or other user input interfaces. User input interface 510 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Speakers 514 may be provided as integrated with other elements of device 500 or may be stand-alone units. Display 512 may be used to display visual content while audio content may be played through speakers 514. In some embodiments, the audio may be distributed to a receiver (not shown), which processes and outputs the audio via speakers 514.

Control circuitry 504 may enable a user to provide user profile information or may automatically compile user profile information. For example, control circuitry 504 may track user preferences for different recommended social media posts and types of recommended social media posts. In some embodiments, control circuitry 504 monitors user inputs, such as queries, texts, calls, conversation audio, social media posts, etc., from which to derive user preferences. Control circuitry 504 may store the user preferences in the user profile. Additionally, control circuitry 504 may obtain all or part of other user profiles that are related to a particular user (e.g., via social media networks), and/or obtain information about the user from other sources that control circuitry 504 may access. As a result, a user can be provided with personalized recommended social media posts.

An application (e.g., for generating a display) may be implemented using any suitable architecture. For example, a stand-alone application may be wholly implemented on user device 500. In some such embodiments, instructions for the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected. An application and/or any instructions for performing any of the embodiments discussed herein may be encoded on computer readable media. Computer readable media includes any media capable of storing data. The computer-readable media may be transitory, including, but not limited to, propagating electrical or electromagnetic signals, or it may be non-transitory including, but not limited to, volatile and non-volatile computer memory or storage devices such as a hard disk, floppy disk, USB drive, DVD, CD, media cards, register memory, processor caches, Random Access Memory (RAM), etc.

In some embodiments, the application is a client-server-based application. Data for use by a thick or thin client implemented on user device 500 is retrieved on demand by issuing requests to a server remote from user device 500. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on user device 500. This way, the processing of the instructions is performed remotely by the server while the resulting displays (e.g., that may include text, a keyboard, or other visuals) are provided locally on user device 500. User device 500 may receive inputs from the user via input interface 510 and transmit those inputs to the remote server for processing and generating the corresponding displays. For example, user device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to user device 500 for presentation to the user.

Figure 6:
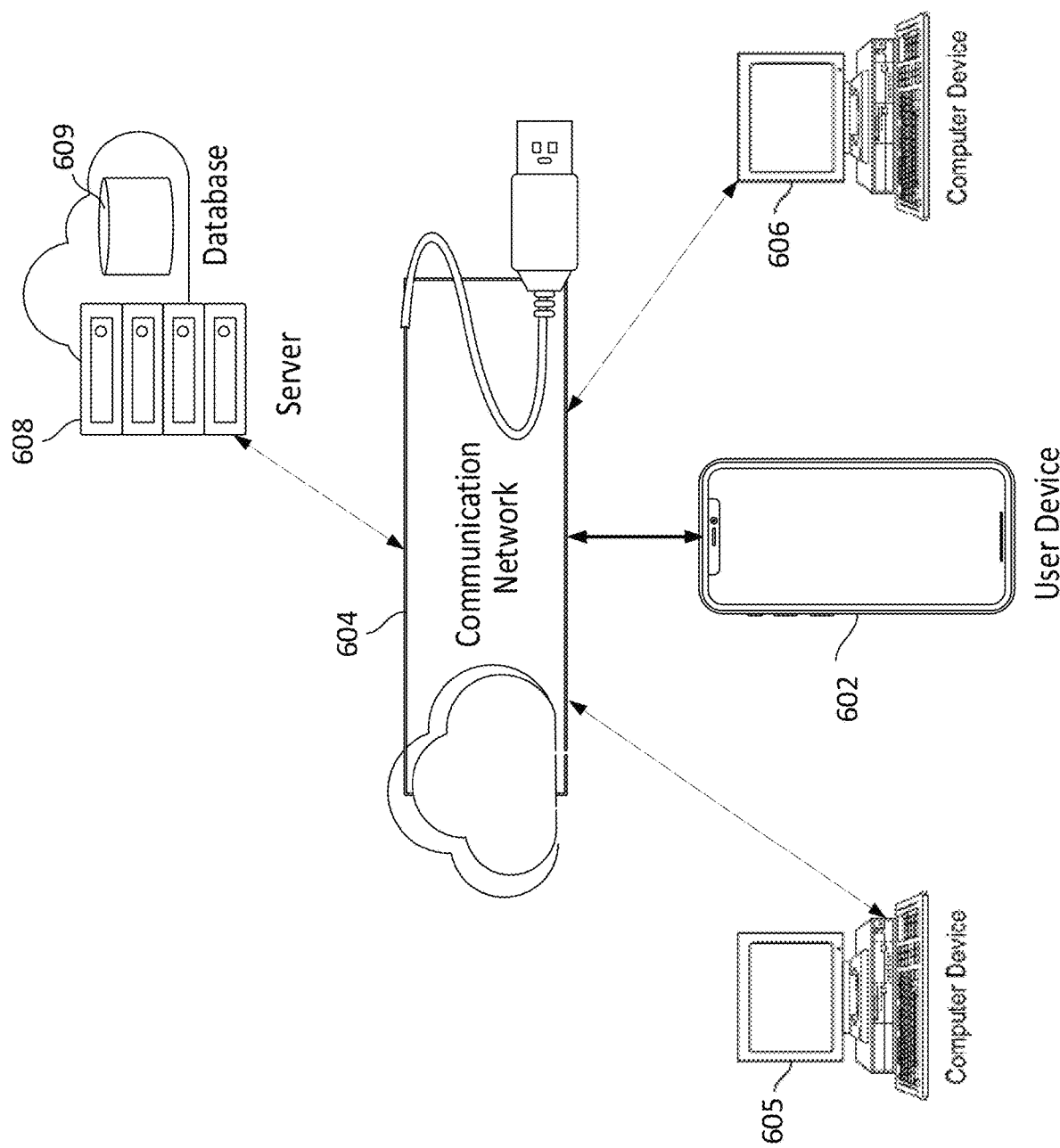
FIG. 6 shows a block diagram of an illustrative system for generating for presentation recommended social media posts, in accordance with some embodiments of this disclosure.

FIG. 6 shows generalized embodiments of a system 600 for recommending social media posts, in accordance with some embodiments of the present disclosure. In system 600, there may be any number of devices. Devices 602, 605, 606 may be coupled to communication network 604. Communication network 604 may be one or more networks including the internet, a mobile phone network, mobile voice or data network (e.g., a 4G or LTE network), cable network, public switched telephone network, Bluetooth®, or other types of communications network or combinations of communication network. Thus, devices 602, 605, 606 may communicate with server 608 over communication network 604 via communications circuitry described above. It should be noted that there may be more than one server 608, but only one is shown in FIG. 6 to avoid overcomplicating the drawing. The arrows connecting the respective device(s) and server(s) represent communication paths, which may include a satellite path, a fiber-optic path, a cable path, a path that supports internet communications (e.g., IPTV), free-space connections (e.g., for broadcast or other wireless signals), or any other suitable wired or wireless communications path or combination of such paths.

Although communication paths are not drawn between devices 602, 605, 606, and server 608, these devices may communicate directly with each other via communication paths, such as short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The media devices may also communicate with each other directly through an indirect path via communication network 604.

Server 608 may include one or more types of content distribution equipment including, intermediate distribution facilities and/or servers, Internet providers, on-demand media servers, and other content providers. Server 608 may be a server of a social media platform (e.g., storing therein executable instructions to provide the social media platform). Server 608 may store in database 609 records of posts in historical social media conversations. Server 608 may also include a database storing metadata of the posts in the historical social media conversations.

Database 609 may include one or more types of stored information, including, for example, historical communication records, user preferences, user profile information, a template database, any other suitable combination, or any combination thereof. Server 608 and/or database 609 may include an applications-hosting database or server, plug-ins, a software developers kit (SDK), an applications programming interface (API), or other software tools configured to provide software (e.g., as download to a user device), run software remotely (e.g., hosting applications accessed by user devices), or otherwise provide applications support to applications of user devices 602, 605, 606. In some embodiments, information from server 608 may be provided to a user device using a client-server approach. In some embodiments, an application client residing on user devices 602, 605, 606 may initiate sessions with server 608 and/or database 609, or a combination thereof to obtain information when needed (e.g., when data is out-of-date or when a user device receives a request from the user to receive data). In some embodiments, information may include user information. For example, the user information may include current and/or historical user activity information (e.g., what communications the user engages in, what times of day the user sends/receives messages, whether the user interacts with a social network, at what times the user interacts with a social network to post information, what types of content the user typically inserts in messages, stored contacts of the user, frequent contacts of the user, any other suitable information, or any combination thereof. In some embodiments, the user information may identify patterns of a given user for a period of more than one year.

In some embodiments, an application may include a social media post analyzer and/or a social media post generator as a standalone application implemented on user devices 602, 605, 606. For example, the application may be implemented as software or a set of executable instructions which may be stored in storage (e.g., storage 508) of the user devices (e.g., user device 500, 501), and executed by control circuitry (e.g., control circuitry 504) of the user devices (e.g., user device 500, 501). In some embodiments, an application may include a social media post analyzer and/or a social media post generator application that is implemented as a client-server-based application where only a client application resides on the user device, and a server application resides on a remote server (e.g., server 608). For example, social media post analyzer and/or a social media post generator application applications may be implemented partially as a client application on user device 602, 605, 606 (e.g., by control circuitry 504 of user equipment device 500) and partially on a remote server as a server application running on control circuitry of the remote server (e.g., control circuitry of server 608). When executed by control circuitry of the remote server, social media post analyzer and/or a social media post generator application may instruct the control circuitry to generate the displays and transmit the generated displays to user devices 602, 605, 606. The server application may instruct the control circuitry of the remote device to transmit data for storage on user device 602, 605, 606. The client application may instruct control circuitry of the receiving user device to generate the application displays.

In some embodiments, the arrangement of system 600 is a cloud-based arrangement. The cloud provides access to services, such as information storage, messaging, or social networking services, among other examples, as well as access to any content described above, for user devices. Services can be provided in the cloud through cloud computing service providers, or through other providers of online services. For example, the cloud-based services can include a storage service, a sharing site, a social networking site, or other services via which user-sourced content is distributed for viewing by others on connected devices. These cloud-based services may allow a user device to store information to the cloud and to receive information from the cloud rather than storing information locally and accessing locally stored information. Cloud resources may be accessed by a user device using, for example, a web browser, a messaging application, a desktop application, a mobile application, and/or any combination of access applications of the same. The user device may be a cloud client that relies on cloud computing for application delivery, or the user equipment device may have some functionality without access to cloud resources. For example, some applications running on the user device may be cloud applications (e.g., applications delivered as a service over the Internet), while other applications may be stored and run on the user device. In some embodiments, a user device may receive information from multiple cloud resources simultaneously.

Figure 7:
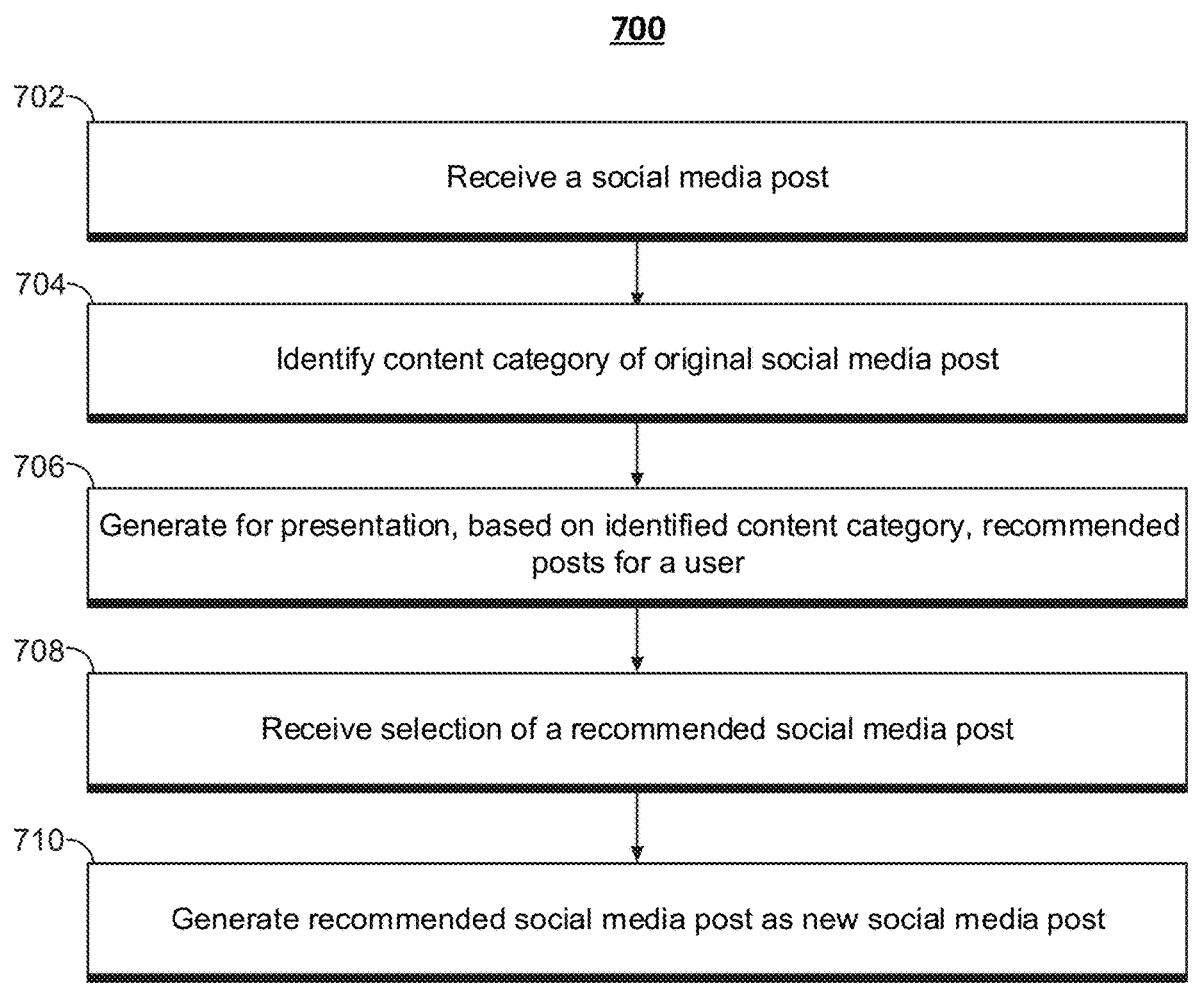
FIG. 7 is a flowchart of a detailed illustrative process for generating for presentation recommended social media posts, in accordance with some embodiments of this disclosure.

FIG. 7 is a flowchart of a detailed illustrative process for generating for presentation recommended social media posts, in accordance with some embodiments of this disclosure. Process 700 may be executed by control circuitry, which may be part of a user device (e.g., device 500 or 501 of FIG. 5; 602, 605, 606 of FIG. 6), or a server (e.g., server 608 of FIG. 6) separated from the user device(s) by way of communication network 604, or distributed over a combination of both. In addition, one or more steps of process 700 may be incorporated into or combined with one or more steps of any other process or embodiment (e.g., process 800 of FIG. 8).

At step 702, control circuitry (e.g., control circuitry of server 608 of FIG. 6) receives a social media post (e.g., from computer device 605 running a social media application). For example, the device may receive (e.g., via I/O circuitry 502 of FIG. 5) the post (e.g., original post 106 of FIG. 1) from a user (e.g., user 104, "Jack Smith," of FIG. 1) operating the device, and transmit the post to server 608. In some embodiments, the original post may comprise one or more content items (e.g., text strings, images, video, audio, etc.). As another example, control circuitry (e.g., control circuitry of server 608 of FIG. 6) may receive the social media post from a database (e.g., database 609 of FIG. 6) in order to perform further processing on the social media post (e.g., to generate recommended social media posts).

At step 704, control circuitry (e.g., control circuitry of server 608 of FIG. 6) may identify (e.g., using social media post analyzer 406 of FIG. 4) one or more content categories associated with the original social media post. For example, if the social media post contains text, the control circuitry may perform NLP (e.g., rule-based NLP, NLP employing one or more machine learning models) to query a database (e.g., database 609 of FIG. 6) with the processing results (e.g., recognized entities or extracted keywords) in order to generate data tags (e.g., happy, graduation, social). If the original post contains one or more images (e.g., alternatively or in addition to text) the control circuitry may perform image processing on the images, extract keywords and determine one or more content categories associated with the extracted keywords. In some embodiments, the control circuitry may perform audio processing (e.g., in the event that the original post contains an audio clip, or a video clip with an audio component).

At step 706, control circuitry (e.g., control circuitry of user device 500 of FIG. 5 and/or server 608 of FIG. 6) may generate for presentation (e.g., using social media post generator 416 of FIG. 4) recommended posts (e.g., posts 116, 118 of FIG. 1; posts 216, 218 of FIG. 2; posts 316, 318 of FIG. 3) for a user (e.g., a user associated with user device 500 of FIG. 5, device 602 of FIG. 6). For example, using the processing results (e.g., NLP, image processing, audio processing), the control circuitry may retrieve one or more relevant text strings and/or images from a database (e.g., database 609 of FIG. 6), and such retrieved content may be provided as one or more recommended social media posts (e.g., posts 418 in FIG. 4). In some embodiments, the retrieved content may be modified, augmented and/or validated prior to being presented to the user. In some embodiments, one or more machine learning models may be employed to generate text for a recommended social media post. For example, the recommended post may include a text string, as illustrated in FIG. 3, relevant and/or responsive to, and in the same language as, the original post (e.g., original post 306 in FIG. 3). As another example, control circuitry (e.g., of server 608 and/or of user device 602 of FIG. 6) may obtain relevant images from a local drive of the local device of the user (e.g., user 112 of FIG. 1), perform a web crawl for relevant images (e.g., a Google search) or retrieve images from the user's profile.

At step 708, control circuitry (e.g., control circuitry of server 608 of FIG. 6) receives a selection of a recommended social media post (e.g., from the user associated with user device 602 of FIG. 6). For example, the device (e.g., device 602 of FIG. 6) may receive selection of a recommended post (e.g., recommended social media post 116 of FIG. 1) from a user (e.g., user 112, of FIG. 1) operating the device and having a profile with the social media platform, and transmit the selected recommended post to the server (e.g., server 608 or another server hosting the social media platform).

At step 710, control circuitry (e.g., control circuitry of server 608 or another server hosting the social media platform) may generate the selected recommended social media post as a new social media post. For example, the new social media post reflecting the content of the selected recommended social media post (e.g., recommended social media post 116 of FIG. 1) may be associated with (e.g., added to the same thread as) the original post.

Figure 8:
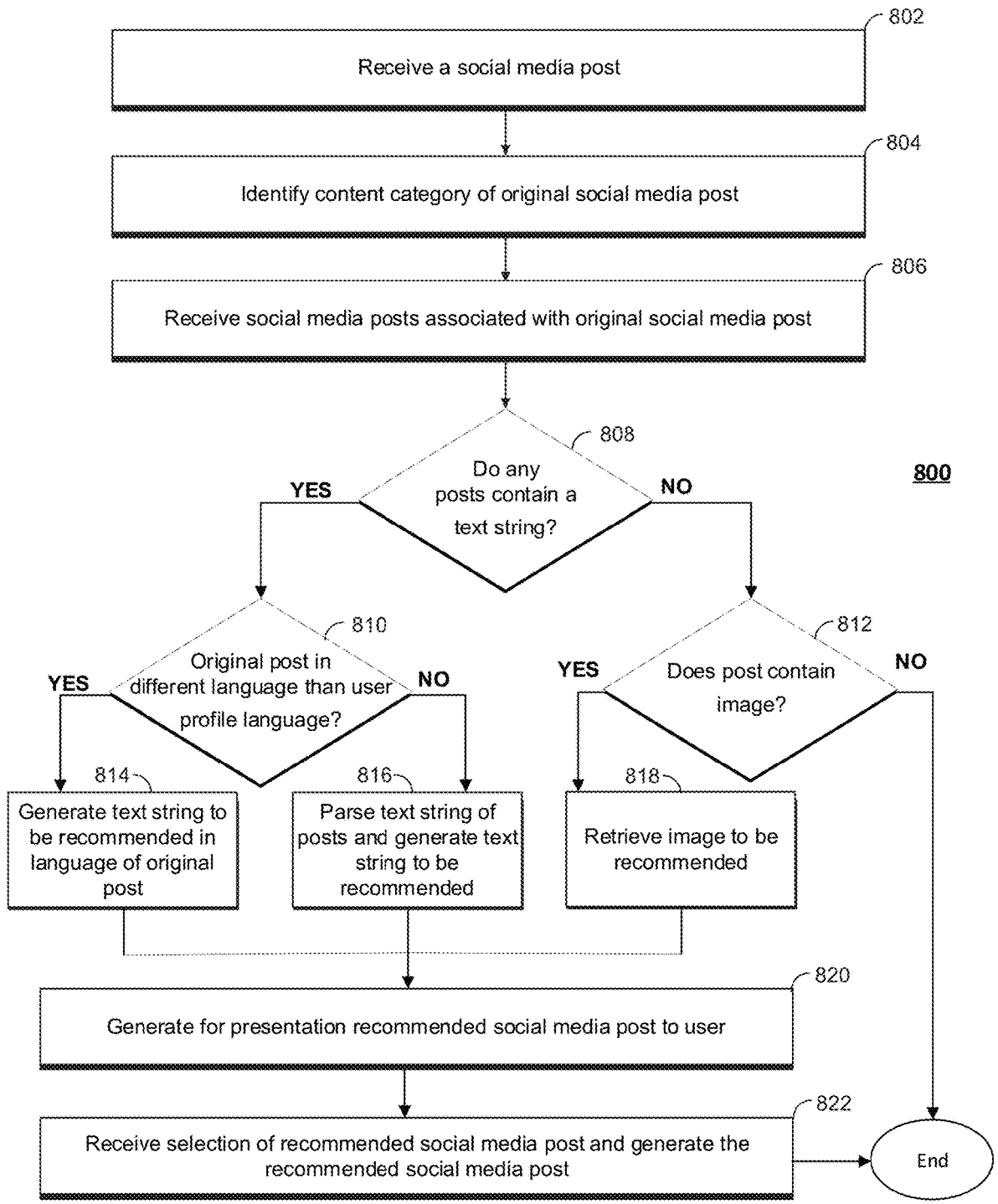
FIG. 8 is a flowchart of a detailed illustrative process for generating for presentation recommended social media posts, in accordance with some embodiments of this disclosure.

FIG. 8 is a flowchart of a detailed illustrative process for generating for presentation recommended social media posts, in accordance with some embodiments of this disclosure. Process 800 may be executed by control circuitry, which may be part of a user device (e.g., device 500 or 501 of FIG. 5; 602, 605, 606 of FIG. 6), or a server (e.g., server 608 of FIG. 6) separated from the user device(s) by way of communication network 604, or distributed over a combination of both. In addition, one or more steps of process 700 may be incorporated into or combined with one or more steps of any other process or embodiment (e.g., process 700 of FIG. 7).

At step 802, control circuitry (e.g., control circuitry of server 608 of FIG. 6) receives a social media post (e.g., from computer device 605 running a social media application). For example, the device may receive the post (e.g., original post 206 of FIG. 2) from a user (e.g., user 204, "Jack Smith," of FIG. 2) operating the device and having a profile with the social media platform, and transmit the post to a server (e.g., server 608 of FIG. 6). In some embodiments, the original post may comprise one or more content items (e.g., text strings, images, video, audio, etc.). As another example, control circuitry (e.g., control circuitry of server 608 of FIG. 6) may receive the social media post from a database (e.g., database 609 of FIG. 6) in order to perform further processing on the social media post (e.g., to generate recommended social media posts).

At step 804, control circuitry (e.g., control circuitry of server 608 of FIG. 6) may identify (e.g., using social media post analyzer 406 of FIG. 4) one or more content categories associated with the original social media post. Step 804 may be performed in a similar manner to step 704 of FIG. 7.

At step 806, control circuitry (e.g., control circuitry of server 608 of FIG. 6) receives one or more social media posts (e.g., from computer device 606 of FIG. 6 running a social media application). For example, a device (e.g., device 606 of FIG. 6) may receive (e.g., via I/O circuitry 502 of FIG. 5) a post (e.g., post 208 of FIG. 2) from a user (e.g., user "Jill Smith," of FIG. 2) operating the device, and transmit the post to the server. The one or more posts may be associated with the original post (e.g., responsive to original post 206 of FIG. 2 and part of the conversation thread). In some embodiments, control circuitry (e.g., control circuitry of server 608 of FIG. 6) may receive the social media post from a database (e.g., database 609 of FIG. 6) in order to perform further processing on the social media post (e.g., to generate recommended social media posts).

At step 808, control circuitry (e.g., control circuitry of the user device and/or of server 608 of FIG. 6) may determine whether any of the one or more posts (e.g., post 208 of FIG. 2) contain a text string. In some embodiments, this determination may be made once a new user (e.g., user 212 of FIG. 2) decides he or she would like to contribute to a conversation (e.g., by selecting option 214 of FIG. 2) or when such user scrolls to, or selects, the conversation presented in the social media platform. At step 810, in response to determining that at least one of the posts (e.g., posts 308, 310 of FIG. 3) contains a text string, the control circuitry may determine whether the original post (e.g., post 306 of FIG. 3) is in a different language than a language associated with a profile of the user (e.g., user 312 of FIG. 3). For example, as illustrated in FIG. 3, original post 306 may contain a text string in a language (e.g., Arabic) different from a language associated with user 312 (e.g., English). Upon determining that the original post is in a different language than a language associated with a profile of the user, the control circuitry may generate a text string in the language of the original post (e.g., Arabic). In some embodiments, the text string may be the same or similar semantically to the posts (e.g., posts 308, 310 of FIG. 1) subsequent to the original post, but in the language of the original post (e.g., Arabic). In some embodiments, commonly used phrases in Arabic for this circumstance may be retrieved (e.g., a popular Arabic quote that may be used to console a friend). As an example, one or more machine learning models may be employed for machine translation and/or semantic analysis.

At step 810, if the control circuitry determines that the original post is in the same language as the language specified in the user profile (e.g., English) the control circuitry may generate, at step 816, a text string to be recommended. For example, similar techniques as those discussed in step 706 of FIG. 7 may be utilized, and text in the one or more subsequent posts (e.g., posts 108, 110 of FIG. 1) may be parsed. For example, control circuitry may perform NLP (e.g., rule-based and/or employing machine learning models) to analyze the text in the one or more posts, and such analysis may be used in conjunction with the identified content category of the original social media post to generate an appropriate text string. In some embodiments, the recommended posts may be similar semantically (e.g., in overall concept and meaning) to the one or more posts subsequent to the original post, but presented in a different manner. The control circuitry may reference a database (e.g., database 609 of FIG. 6) in generating the text string (e.g., to retrieve similar historical posts as suggestions and/or templates for the recommended posts) and/or utilize machine learning models to generate a recommended post.

At step 808, control circuitry (e.g., control circuitry of the user device and/or of server 608 of FIG. 6) may determine that none of the posts (e.g., posts 108, 110 of FIG. 1) contain a text string. At step 812, the control circuitry may determine whether any of the posts contain an image. Those of skill in the art will appreciate that the system may determine that a post contains both an image and text, and suitably process each content item. At step 818, the control circuitry may retrieve an image to be recommended, in a similar manner as discussed in connection with step 706 of FIG. 7, and images in the one or more subsequent posts (e.g., post 208 of FIG. 2) may be parsed. In some embodiments, the recommended posts may include images which may be related (e.g., classified in a same or similar content category in database 609 of FIG. 6) to the one or more posts subsequent to the original post, but presented in a different manner. For example, as illustrated in FIG. 2, retrieved images in recommended posts 216, 218 may be related to graduation (e.g., a silhouette holding a diploma, and a diploma) but may be presented in a manner different from the prior posts (e.g., posts 206 and 208 of FIG. 2).

In some embodiments, validation techniques may be employed to ensure that content in the recommended post is not identical to previously posted content. In some embodiments, in generating the recommended social media posts, the system may ignore irrelevant posts during the parsing and analysis of the posts. For example, there may be a plurality of posts associated with an original post, and the system may determine that one of the plurality of posts (e.g., an advertisement in the form of a post) is unrelated to a content category of the original post or is not semantically similar to other posts of the plurality and should not factor in the analysis.

At step 820, the control circuitry may generate for presentation the recommended social media posts to the user (e.g., user 112 of FIG. 1). In some embodiments, the recommended posts may include one or more content items (e.g., text, images, audio, video, or any combination thereof). The content items of the recommended posts may or may not correspond to a content type of the original post and posts associated with the original post. For example, in some embodiments, the system may recommend images only if the parsed posts contain images. Alternatively, the system may recommend images even if the parsed posts do not contain any images.

At step 822, upon receiving the selection of a recommended social media post, control circuitry (e.g., control circuitry of server 608 or another server hosting the social media platform) may generate the selected recommended social media post as a new social media post. For example, the new social media post reflecting the content of the selected recommended social media post (e.g., recommended social media post 116 of FIG. 1) may be associated with (e.g., added to the same thread as) the original post.

It is contemplated that the steps or descriptions of FIGS. 7-8 may be used with any other embodiment of this disclosure. In addition, the descriptions described in relation to the algorithm of FIGS. 7-8 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the processes of FIGS. 7-8 may be implemented on a combination of appropriately configured software and hardware, and that any of the devices or equipment discussed in relation to FIGS. 1-6 could be used to implement one or more portions of the process.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for recommending a social media post, the method comprising:
identifying one or more content categories associated with a first social media post posted to a social media platform, as an original post in a conversation thread, by a first user;
parsing two or more second social media posts posted to the social media platform by one or more second users, wherein the two or more second social media posts are subsequent posts to the original post in the conversation thread associated with and responsive to the first social media post;
generating a subset of the parsed two or more second social media posts that excludes one of the parsed two or more second social media posts that is unrelated to the conversation thread;
based at least in part on the identified one or more content categories of the first social media post and the subset of the parsed two or more second social media posts, generating one or more recommended social media posts for presentation to a third user as candidates to be posted in the conversation thread, wherein the one or more recommended social media posts:
are responsive to and associated with the first social media post; and
semantically match at least one of the two or more second social media posts by the one or more second users;
determining the third user has selected one of the one or more recommended social media posts; and
based at least in part on the determining the third user has selected one of the one or more recommended social media posts, causing to be posted to the social media platform, as a successive post to the original and subsequent posts in the conversation thread, the selected one of the one or more recommended social media posts.

2. The method of claim 1, wherein:
parsing the two or more second social media posts by the one or more second users comprises:
determining whether at least one of the two or more second social media posts contains a text string; and
in response to determining that at least one of the two or more second social media posts contains a text string, performing natural language processing on the text string; and
generating the one or more recommended social media posts for presentation to the third user comprises:
generating a query based on the natural language processing of the text string; and
forwarding the query to a database to retrieve a candidate text string, wherein one of the one or more recommended social media posts is generated based on the retrieved candidate text string.

3. The method of claim 2, wherein one or more trained machine learning models are used to perform the natural language processing and generate the query.

4. The method of claim 3, wherein the one or more trained machine learning models are trained to learn vector representations of words, and the vector representations are used to compute semantical similarity between the text string and the candidate text string.

5. The method of claim 1, further comprising:
determining a first language associated with a profile of the third user;
determining whether the first social media post includes a text string in a second language different from the first language; and
in response to determining that the first social media post includes the text string in the second language, causing one of the one or more recommended social media posts to include a text string in the second language, wherein the text string in the second language is presented together with a translation into the first language of the text string in the second language.

6. The method of claim 1, wherein:
parsing the two or more second social media posts by the one or more second users comprises:
determining whether at least one of the two or more second social media posts contains a first image; and
identifying one or more content categories associated with the first image; and
generating the one or more recommended social media posts for presentation to the third user comprises retrieving a second image associated with the one or more content categories, and providing the retrieved second image as one of the one or more recommended social media posts.

7. The method of claim 6, wherein the retrieved second image is retrieved from a local device of the third user, a social media profile associated with the third user, or a remote server.

8. The method of claim 1, wherein identifying the one or more content categories associated with the first social media post further comprises determining a location associated with the first social media post.

9. The method of claim 1, wherein:
the first social media post is posted at a first time, the two or more second social media posts are posted at respective times after the first time; and
the selected one of the one or more recommended social media posts is posted at a second time after the first time and the respective times.

10. A system for recommending a social media post, the system comprising:
control circuitry configured to:
identify one or more content categories associated with a first social media post posted to a social media platform, as an original post in a conversation thread, by a first user;
parse two or more second social media posts posted to the social media platform by one or more second users, wherein the two or more second social media posts are subsequent posts to the original post in the conversation thread associated with and responsive to the first social media post;
generate a subset of the parsed two or more second social media posts that excludes one of the parsed two or more second social media posts that is unrelated to the conversation thread;
based at least in part on the identified one or more content categories of the first social media post and the subset of the parsed two or more second social media posts, generating one or more recommended social media posts for presentation to a third user as candidates to be posted in the conversation thread, wherein the one or more recommended social media posts:
are responsive to and associated with the first social media post; and
semantically match at least one of the two or more second social media posts by the one or more second users;
determine the third user has selected one of the one or more recommended social media posts; and
based at least in part on the determining the third user has selected one of the one or more recommended social media posts, cause to be posted to the social media platform, as a successive post to the original and subsequent posts in the conversation thread, the selected one of the one or more recommended social media posts.

11. The system of claim 10, wherein:
in parsing the two or more second social media posts by the one or more second users, the control circuitry is further configured to:
determine whether at least one of the two or more second social media posts contains a text string; and
in response to determining that at least one of the two or more second social media posts contains a text string, perform natural language processing on the text string; and
in generating the one or more recommended social media posts for presentation to the third user, the control circuitry is further configured to:
generate a query based on the natural language processing of the text string; and
forward the query to a database to retrieve a candidate text string, wherein one of the one or more recommended social media posts is generated based on the retrieved candidate text string.

12. The system of claim 11, wherein one or more trained machine learning models are used to perform the natural language processing and generate the query.

13. The system of claim 12, wherein the one or more trained machine learning models are trained to learn vector representations of words, and the vector representations are used to compute semantical similarity between the text string and the candidate text string.

14. The system of claim 10, wherein the control circuitry is further configured to:
determine a first language associated with a profile of the third user;
determine whether the first social media post includes a text string in a second language different from the first language; and
in response to determining that the first social media post includes the text string in the second language, cause one of the one or more recommended social media posts to include a text string in the second language, wherein the text string in the second language is presented together with a translation into the first language of the text string in the second language.

15. The system of claim 10, wherein:
in parsing the two or more second social media posts by the one or more second users, the control circuitry is configured to:

determine whether at least one of the two or more second social media posts contains a first image;

identify one or more content categories associated with the first image; and in generating the one or more recommended social media posts for presentation to the third user, the control circuitry is configured to retrieve a second image associated with the one or more content categories and provide the retrieved second image as one of the one or more recommended social media posts.

16. The system of claim 15, wherein the retrieved second image is retrieved from a local device of the third user, a social media profile associated with the third user, or a remote server.

17. The system of claim 10, wherein in identifying the one or more content categories associated with the first social media post, the control circuitry is configured to determine a location associated with the first social media post.

18. The system of claim 10, wherein:

the first social media post is posted at a first time, the two or more second social media posts are posted at respective times after the first time; and the selected one of the one or more recommended social media posts is posted at a second time after the first time and the respective times.

19. A method for recommending a social media post, the method comprising:

identifying one or more content categories associated with a first social media post posted to a social media platform, as an original post in a conversation thread, by a first user;

parsing two or more second social media posts posted to the social media platform by one or more second users, wherein the two or more second social media posts are subsequent posts to the original post in the conversation thread associated with and responsive to the first social media post;

generating a subset of the parsed two or more second social media posts that excludes one of the parsed two or more second social media posts that is unrelated to the conversation thread;

based at least in part on the identified one or more content categories of the first social media post and the subset of the parsed two or more second social media posts, generating one or more recommended social media posts for presentation to a third user as candidates to be posted in the conversation thread, wherein the one or more recommended social media posts are responsive to and associated with the first social media post;

determining the third user has selected one of the one or more recommended social media posts; and based at least in part on the determining the third user has selected one of the one or more recommended social media posts, causing to be posted to the social media platform, as a successive post to the original and subsequent posts in the conversation thread, the selected one of the one or more recommended social media posts.

20. The method of claim 19, further comprising determining the one of the parsed two or more second social media posts is unrelated to the conversation thread by determining the post is at least one of unrelated to a content category of the first social media post or is not semantically similar to other posts of the parsed two or more second social media posts.

* * * * *